United States Patent
Ichimaru (10) Patent No.: US 6,971,628 B2
(45) Date of Patent: Dec. 6, 2005

(54) DIRECT-ACTING ELECTRIC OPERATED VALVE

(75) Inventor: Hironobu Ichimaru, Chikugo (JP)

(73) Assignee: Ichimaru Giken Co., Ltd., Chikugo (JP)

( * ) Notice: Subject to any disclaimer, the term of this patent is extended or adjusted under 35 U.S.C. 154(b) by 166 days.

(21) Appl. No.: 10/381,121

(22) PCT Filed: Sep. 20, 2001

(86) PCT No.: PCT/JP01/08213

§ 371 (c)(1),
(2), (4) Date: Sep. 15, 2003

(87) PCT Pub. No.: WO02/25152

PCT Pub. Date: Mar. 28, 2002

(65) Prior Publication Data

US 2005/0098751 A1    May 12, 2005

(30) Foreign Application Priority Data

Sep. 22, 2000   (JP) .............................. 2000-288045

(51) Int. Cl.$^7$ ............................................ F16K 31/02

(52) U.S. Cl. ............ 251/129.11; 251/251; 137/625.27; 74/55

(58) Field of Search ...................... 251/129.11, 129.12, 251/251, 264, 277, 278; 137/625.25, 625.27; 74/55, 56, 57, 567

(56) References Cited

U.S. PATENT DOCUMENTS

| | | | |
|---|---|---|---|
| 4,621,656 A | * 11/1986 | Ichimaru | ................ 137/625.66 |
| 4,694,390 A |   9/1987 | Lee | |
| 5,873,335 A | *  2/1999 | Wright et al. | ............. 123/90.11 |
| 6,007,047 A | * 12/1999 | Phipps | ........................ 251/252 |

FOREIGN PATENT DOCUMENTS

| | | |
|---|---|---|
| JP | 57-75267 | 5/1982 |
| JP | H01-111877 | 7/1989 |

* cited by examiner

*Primary Examiner*—Edward K. Look
*Assistant Examiner*—John K. Fristoe, Jr.
(74) *Attorney, Agent, or Firm*—Flynn, Thiel, Boutell & Tanis, P.C.

(57) ABSTRACT

A direct-acting electric operated valve has a stem which reciprocates by an electric motor without using air pressure.

In this direct-acting electric operated valve, as the stem 2 vertically reciprocates, a first passage 11 and a second passage 12 are switched over. A cam mechanism 4 is formed for converting rotary reciprocating motion of an eccentric cam 42 which rotary reciprocates by an electric motor 40 into vertical reciprocating motion. The eccentric cam is retained at an upper retaining position X which is slightly exceeding a top dead center X1 and at a lower retaining position Y which is slightly exceeding a bottom dead center Y1. In a state in which an integral coil spring 35 which is previously held between an upper spring seat 32 and a lower spring seat 34 in its compressed state is mounted to a spring shaft 30 which extends from a cam mechanism, the coil spring 35 is accommodated in a spring case 36 connected to the stem.

18 Claims, 6 Drawing Sheets

Fig.7

DIRECT-ACTING ELECTRIC OPERATED VALVE

TECHNICAL FIELD

In a direct-acting valve which is opened and closed by reciprocating motion of a stem, the present invention relates to a direct-acting electric operated valve using an electric motor as driving means of the stem.

BACKGROUND ART

In a conventional direct-acting valve of this kind, an air cylinder is used as driving means of a stem. In an air driving type piston valve, air pressure is used for driving the valve, an air pipe (usually copper pipe) is required up to a valve body, and since a piston section is driven by ON/OFF operation of the air pressure, a solenoid valve is provided separately from the air pipe to switch an original pressure and an atmospheric pressure, thereby opening and closing the valve body.

According to the conventional piston valve, however, construction cost and maintenance cost are required for the copper pipe and solenoid valve, and if the number of valves is increased, wiring operation from a valve stand to the solenoid valve is troublesome. There is also a problem that when power supply is stopped, there is danger that air is vent and the piston is returned by a spring.

The present invention has been accomplished to solve such conventional problem, and it is an object of the invention to provide a direct-acting electric operated valve in which a stem reciprocates by an electric motor without using air pressure.

DISCLOSURE OF THE INVENTION

To solve the above problem, the present invention (claim 1) provides a direct-acting electric operated valve in which as a stem vertically reciprocates, a valve body reciprocates between a first valve opening and a second valve opening, a second passage is brought into communication in a closed state of the first valve opening by the valve body, and a first passage is brought into communication in a closed state of the second valve opening by the valve body, comprising a cam mechanism for converting rotary reciprocating motion of a rotor which rotary reciprocates by an electric motor into vertical reciprocating motion, and a spring mechanism provided between the cam mechanism and the stem, wherein if the cam mechanism moves upward, the stem moves upward through the spring mechanism, the first valve opening is closed by the valve body, the stem moves upward by the spring mechanism and the closed state of the first valve opening by the valve body is maintained, if the cam mechanism moves downward, the stem is moved downward by the spring mechanism, the valve body closes the second valve opening, the stem is held downward by the spring mechanism, and the closed state of the second valve opening by the valve body is maintained. The cam mechanism converts the rotary reciprocating motion of the rotor cam into vertical reciprocating motion of a cam-receiving plate. The eccentric cam is retained at an upper retaining position which slightly exceeds a top dead center position and at a lower retaining position which slightly exceeds a bottom dead center.

According to this direct-acting electric operated valve, the rotary reciprocating motion of the rotor using the electric motor as driving means is converted into vertical reciprocating motion, and the vertical reciprocating motion of the cam mechanism is transmitted to the stem through the spring mechanism.

When the stem moves upward, the valve body closes the first valve opening, the stem is biased upward by the spring mechanism, and the closed state of the first valve opening by the valve body is maintained.

When the stem moves downward, the valve body closes the second valve opening, the stem is biased downward by the spring mechanism, and the closed state of the second valve opening by the valve body is maintained.

The spring mechanism may be provided with a spring for biasing the stem upward and a spring for biasing the stem downward, or one spring may bias the stem both upward and downward.

Further, in this direct-acting electric operated valve, the cam mechanism converts the rotary reciprocating motion into the vertical reciprocating motion.

In order to maintain the closed state of the valve opening by the valve body, it is necessary to bias the stem by the spring mechanism, and reverse reaction force is applied to the eccentric cam. Therefore, if the electric motor is stopped in a state in which the valve opening is closed by the valve body, it becomes necessary to limit the reverse rotation of the eccentric cam.

At that time, the eccentric cam can be retained at an upper retaining position which is slightly exceeding a top dead center and at a lower retaining position which is slightly exceeding a bottom dead center. Therefore, it is possible to limit the reverse rotation of the eccentric cam, the members can be held in their positions, and the closed state of the valve opening by the valve body can be maintained.

Next, in the above direct-acting electric operated valve, the spring mechanism is accommodated in a spring case which is connected to the stem (or cam mechanism) in a state in which an integral coil spring held between an upper spring seat and a lower spring seat is mounted to a spring shaft extending from the cam mechanism (or stem), in a state in which the cam mechanism moves upward and the stem moves upwards through the spring mechanism and the valve body closes the first valve opening, the lower spring seat is biased by the coil spring and fixed to the spring shaft, the upper spring seat is engaged with the spring case to bias the stem upward, and the closed state of the first valve opening by the valve body is maintained, in a state in which the cam mechanism moves downward and the stem moves downward through the spring mechanism and the valve body closes the second valve opening, the upper spring seat is biased by the coil spring and fixed to the spring shaft, the lower spring seat is engaged with the spring case to bias the stem downward, and the closed state of the second valve opening by the valve body is maintained, in a state in which the stem is moved upward by the cam mechanism acting through the spring mechanism and the valve body moves between the first valve opening and the second valve opening. The upper spring seat and the lower spring seat are biased by the coil spring and fixed to the spring shaft, thereby integrally forming the spring mechanism.

In this case, the direct-acting electric operated valve is characterized in that the spring mechanism is provided with the integral coil spring.

The closed state of the valve opening by the valve body is established by biasing the stem by the spring mechanism. Radically, a spring for biasing the stem upward and a spring for biasing the stem downward are necessary. Thus, the number of parts is increased, and the structure of the spring mechanism becomes complicated.

Thereupon, the coil spring is held between the upper spring seat and the lower spring seat and the spring mechanism is accommodated in the spring case. With this arrangement, the biasing force both upward and downward can be obtained with the one integral coil spring, the number of parts can be reduced and the structure of the spring mechanism can be simplified.

Further, the direct-acting electric operated valve of the present invention is a direct-acting electric operated valve in which a stem vertically reciprocates. A valve body reciprocates between a first valve opening and a second valve opening. A second passage is brought into communication with a main passage in a closed state of the first valve opening by the valve body, and a first passage is brought into communication with the main passage in a closed state of the second valve opening by the valve body. A cam mechanism converts rotary reciprocating motion of a rotor driven by an electric motor into vertical reciprocating motion. A spring mechanism is provided between this cam mechanism and the stem, wherein if the cam mechanism moves upward, the stem is moved upward by the spring mechanism, the first valve opening is closed by the valve body, the stem is held upward by the spring mechanism and the closed state of the first valve opening by the valve body is maintained.

If the cam mechanism moves downward, the stem is moved downward by the spring mechanism, the valve body closes the second valve opening, the stem is held downward by the spring mechanism, and the closed state of the second valve opening by the valve body is maintained.

A cylinder body which laterally rotary reciprocates is used as the rotor. The cam mechanism converts the rotary reciprocating motion of the cylinder body into vertical reciprocating motion of the cylinder body itself through a vertical helical cam groove and a guide pin which is slidably fitted into the helical cam groove. The helical cam groove is formed at its portions slightly short of its upper and lower ends with reversely inclined portions.

In this case, the direct-acting electric operated valve is characterized in that the cylinder body is used as the rotor which constitutes the cam mechanism, and the rotary reciprocating motion of the cylinder body is converted into the vertical reciprocating motion of the cylinder body itself through the helical cam groove and the guide pin.

In order to maintain the closed state of the valve opening by the valve body, it is necessary to bias the stem by the spring mechanism and thus, reverse reaction force is applied to the cylinder body. Therefore, if the electric motor is stopped after the valve opening is closed by the valve body, it is necessary to limit the rotation of the cylinder body.

At that time, the helical cam groove is formed at its portions slightly short of its upper end lower ends with reversely inclined portions. Therefore, the reverse rotation of the cylinder body can be limited, the members can be held in their positions, and the closed state of the valve opening by the valve body can be maintained.

Next, in the above direct-acting electric operated valve, the spring mechanism is accommodated in a spring case which is connected to the stem (or cylinder body) in a state in which an integral coil spring held between an upper spring seat and a lower spring seat is mounted to a spring shaft extending from the cylinder body (or stem), in a state in which the cam mechanism moves upward and the stem moves upwards through the spring mechanism and the valve body closes the first valve opening, the lower spring seat is biased by the coil spring and fixed to the cylinder body, the upper spring seat is engaged with the stem to bias the stem upward, and the closed state of the first valve opening by the valve body is maintained, in a state in which the cam mechanism moves downward and the stem moves downward through the spring mechanism and the valve body closes the second valve opening, the upper spring seat is biased by the coil spring and fixed to the cylinder body, the lower spring seat is engaged with the stem to bias the stem downward, and the closed state of the second valve opening by the valve body is maintained, in a state in which the stem is moved by the cam mechanism acting through the spring mechanism and the valve body moves between the first valve opening and the second valve opening, the upper spring seat and the lower spring seat are biased by the coil spring and fixed to the cylinder body, the upper spring seat and the lower spring seat are engaged with the stem, thereby integrally forming the spring mechanism.

In this case, the direct-acting electric operated valve is characterized in that the spring mechanism is provided with an integral coil spring.

That is, the coil spring is held between the upper spring seat and the lower spring seat and accommodated in the spring case. With this arrangement, the biasing force both upward and downward can be obtained with the one integral coil spring, the number of parts can be reduced and the structure of the spring mechanism can be simplified.

Further, in the above direct-acting electric operated valve, the rotor is abutted and stopped at the reciprocating end and then, the electric motor is stopped by a timer.

In this case, if the rotary reciprocating rotor reaches the reciprocating end, the rotor abuts and stops at the reciprocating end position. In a state in which the electric motor keeps operating, the excessive load keeps being applied and thus, the electric motor is stopped by the timer.

Therefore, it is possible to prevent the motor driving system from being damaged while precisely stopping the electric motor at the reciprocating end position of the rotor.

Further, in the direct-acting electric operated valve of the present invention, a position sensor detects a rotary reciprocating position of the rotor, and the electric motor is stopped by a signal from the position sensor.

In this case, if the rotor reaches the top dead center or the bottom dead center, the electric motor is stopped by a signal from the position sensor and thereafter, the rotor reaches the reciprocating end by the inertia force and the spring force. Therefore, it is possible to prevent the motor driving system from being damaged while precisely stopping the electric motor at the reciprocating end position of the rotor.

Further, in the direct-acting electric operated valve of the invention a coil spring is mounted in its compressed state.

Usually, biasing force of a spring is proportional to a stroke obtained by compressing the spring. Therefore, in order to obtain large biasing force, a large stroke is required, and the apparatus is increased in size correspondingly.

Thereupon, if the coil spring is restrained by the upper spring seat, the lower spring seats the spring shaft (cylinder body) and the spring case (stem), and the coil spring is previously compressed and mounted, the biasing force for maintaining the closed state of the valve opening by the valve body can be obtained by additionally compressing the spring with short stroke from the compressed state. Thus, it is possible to make the vale compact by shortening the stroke, and to reduce the energy required for compressing the spring.

In each of the above inventions, although the operational direction of each member is explained based on the operational direction of the stem as being the vertical direction for the sake of convenience, the operational direction of the stem can be a horizontal direction of course. In this case, the operational direction of each member corresponds to the operational direction of the stem.

BEST MODE FOR CARRYING OUT THE INVENTION

Embodiments of the present invention will be explained below. Concrete structures of the invention are not of course limited to each of the embodiments shown below.

Figure 1:
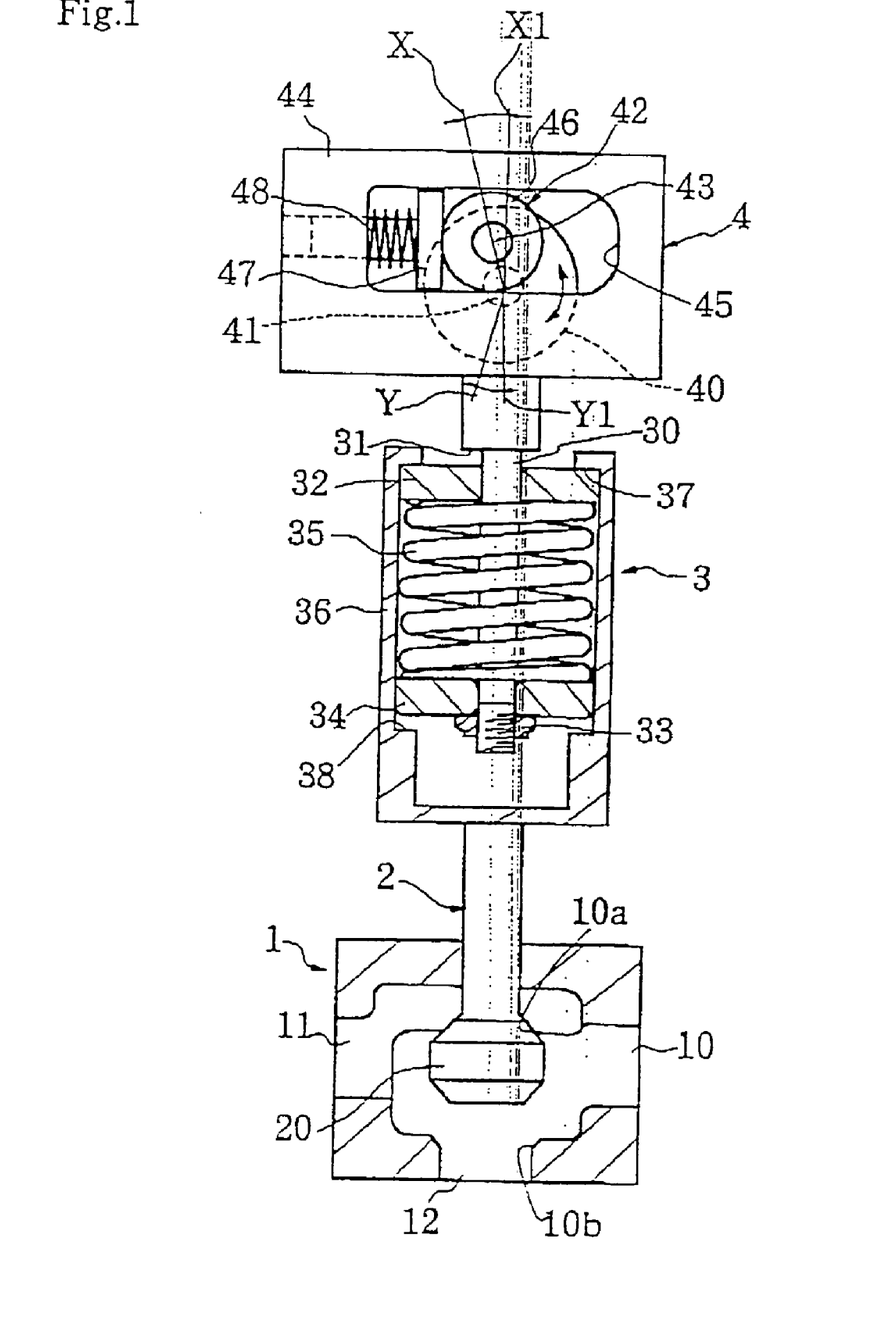
FIG. 1 is a front sectional view of a direct-acting electric operated valve according to a first embodiment of the present invention.
Figure 2:
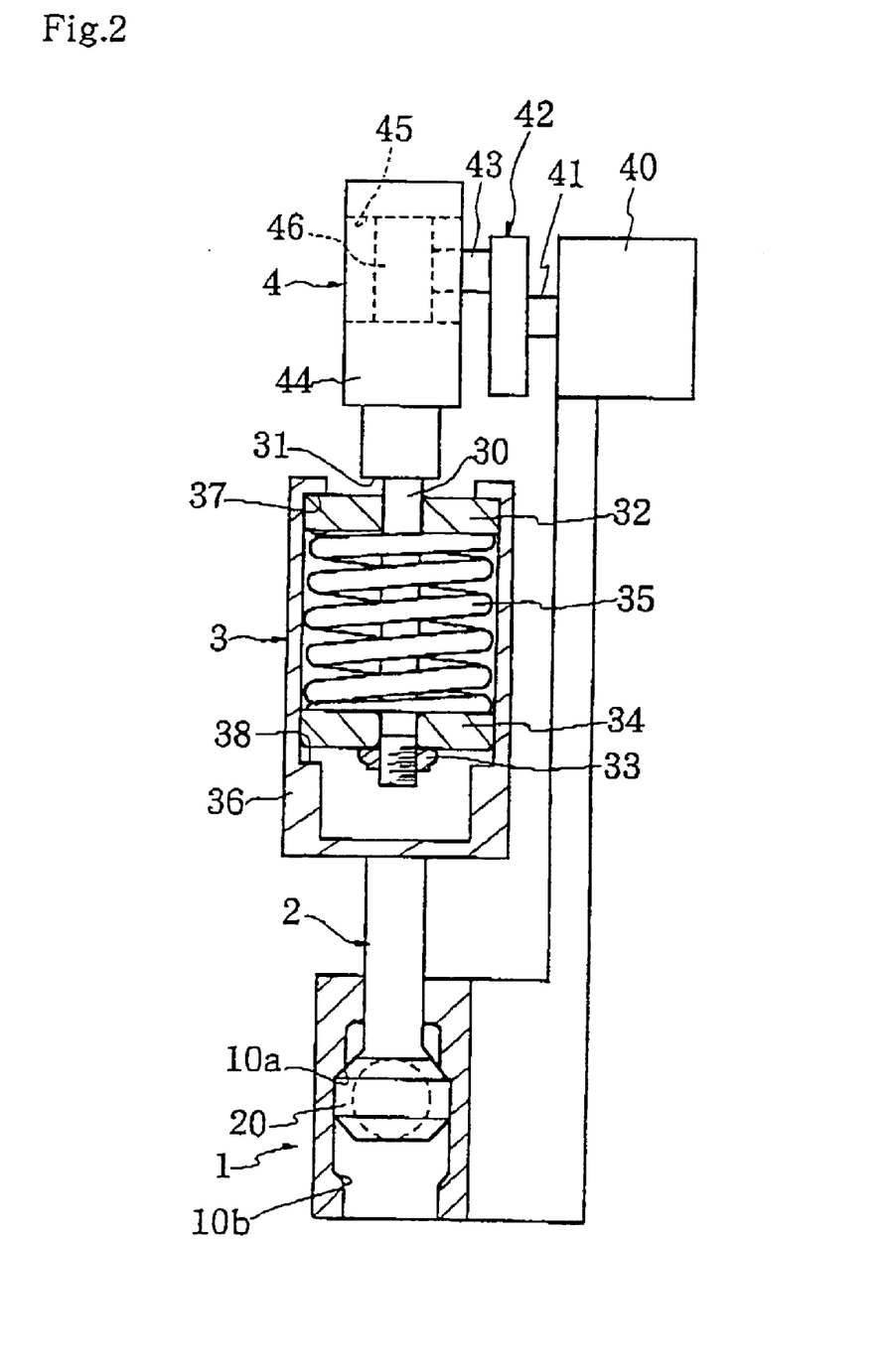
FIG. 2 is a side sectional view of the direct-acting electric operated valve.
Figure 3:
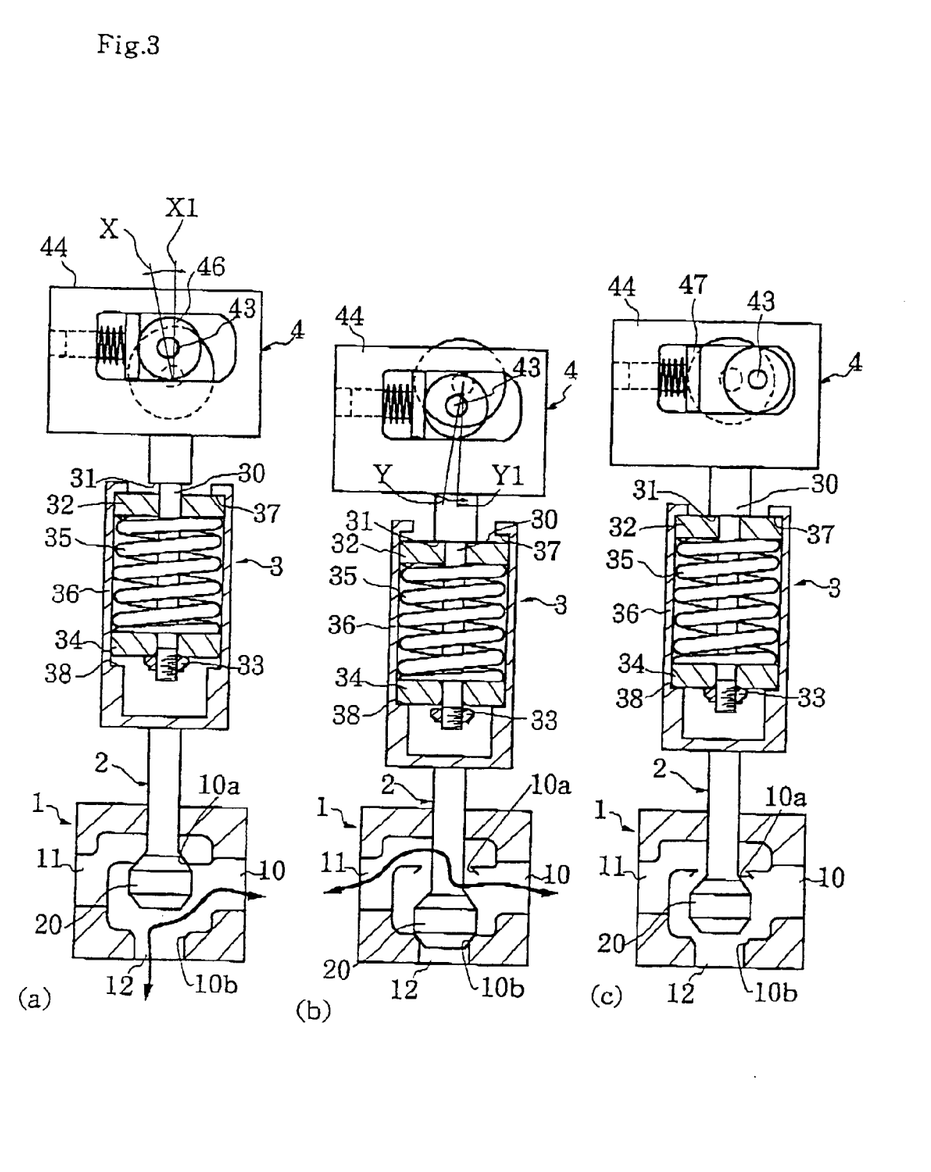
FIG. 3 are explanatory views of operation of the direct-acting electric operated valve.

FIG. 1 is a front sectional view of a direct-acting electric operated valve according to a first embodiment of the present invention. FIG. 2 is a side sectional view of the direct-acting electric operated valve. FIG. 3 is an explanatory view of operation of the direct-acting electric operated valve.

In the drawings, a reference number represents a valve body. Formed in the valve body 1 are a main passage 10, a first passage 11 which is in communication with the main passage 10 through a first valve opening 10a, and a second passage 12 which is in communication with the main passage 10 through a second valve opening 10b.

When a stem 2 vertically reciprocates, a valve body 20 vertically reciprocates between the first valve opening 10a and the second valve opening 10b. In this case, this direct-acting electric operated valve can switch passages such that if the stem 2 moves upward and the first valve opening 1a is closed with the valve body 20, the main passage 10 and the second passage 12 are brought into communication with each other, and if the stem 2 moves downward and the second valve opening 10b is closed with the valve body 20, the main passage 10 and the first passage 11 are brought into communication with each other.

The stem 2 is connected to a cam mechanism 4 through a spring mechanism 3.

The cam mechanism 4 has an electric motor 40 having a motor shaft 41. The motor shaft 41 is provided with an eccentric cam (rotor) 42 which vertically rotary reciprocates. An eccentric shaft 43 of the eccentric cam 42 is rotatably fitted, through a roller 46, into a laterally long hole 45 formed on a cam-receiving plate 44 so that rotary reciprocating motion of the eccentric cam 42 caused by the electric motor 40 is converted into vertical reciprocating motion of the cam-receiving plate 44.

The cam-receiving plate 44 is provided with a stopper 47. The stopper 47 is retained at an upper retaining position X which is slightly exceeding a top dead center X1 and at a lower retaining position Y which is slightly exceeding a bottom dead center Y1. The stopper 47 is resiliently supported by a spring 48.

The spring mechanism 3 includes a spring shaft 30 which downwardly extends from the cam-receiving plate 44. Mounted to the spring shaft 30 are an upper spring seat 32 whose upward movement is limited by a step 31, a lower spring seat 34 whose downward movement is limited by a nut 33, and an integral coil spring 35 which is previously compressed and held between both the spring seats 32 and 34. These upper spring seat 32, lower spring seat 34 and coil spring 35 are accommodated in a spring case 36 which is connected to an upper end of the stem 2.

In this case, the spring shaft 30 may be allowed to extend from an upper end of the stem 2, and the spring case 36 may be connected to the cam-receiving plate 44.

As shown in FIG. 3(a), if the cam-receiving plate 44 formed on the cam mechanism 4 moves upward, the stem 2 moves upward through the spring mechanism 3. In a state in which the valve body 20 closes the first valve opening 10a, the lower spring seat 34 is fixed to the nut 33 of the spring shaft 30 by biasing force of the coil spring 35, and the upper spring seat 32 is engaged with an upper retaining portion 37 of the spring case 36. With this arrangement, the stem 2 is biased upward, and the closed state of the first valve opening 10a by the valve body 20 is maintained.

As shown in FIG. 3(b), in a state in which the cam-receiving plate 44 provided on the cam mechanism 4 moves downward, the stem 2 moves downward through the spring mechanism 3 and the valve body 20 closes the second valve opening 10b, the upper spring seat 32 is biased by the coil spring 35 and fixed to the step 31 of the spring shaft 30, and the lower spring seat 34 is engaged with the lower retaining portion 38 of the spring case 36 to bias the stem downward, and the closed state of the second valve opening by the valve body is maintained.

As shown in FIG. 3(c), in a state in which the stem 2 is moved by the cam mechanism 4 through the spring mechanism 3, and the valve body 20 moves between the first valve opening 10a and the second valve opening 10b, the upper spring seat 32 and the lower spring seat 34 are biased by the coil spring 35 and fixed to the step 31 of the spring shaft 30 and the nut 33, the upper spring seat 32 and the lower spring seat 34 are engaged with the upper retaining portion 37 and the lower retaining portion 38 of the spring case 36, thereby integrally forming the spring mechanism 3.

According to the direct-acting electric operated valve, the rotary reciprocating motion of the eccentric cam (rotor) using the electric motor 40 as the driving means is converted into the vertical reciprocating motion by the cam mechanism 4, and this vertical reciprocating motion is transmitted to the stem 2 through the spring mechanism 3.

Therefore, unlike the conventional air driving type piston valve using an air cylinder as the driving means for the stem 2, the direct-acting electric operated valve of the present invention does not required the air pipe (usually copper pipe), construction and maintenance costs are not required for the copper pipe and the solenoid valve.

Further, since the eccentric cam 42 is retained at the upper retaining position X which is slightly exceeding the top dead center X1 and at the lower retaining position Y which is slightly exceeding the bottom dead center Y1. Therefore, it is possible to keep biasing the stem 2 while preventing the eccentric cam 42 from rotating reversely. With this arrangement, each member can be held at its own position, and the closed states of the valve openings 10a and 10b by the valve body 20 can be maintained.

Therefore, it is possible to eliminate danger that when power supply is stopped, air is vent and the piston is returned by a spring unlike the conventional air driving type piston valve.

Further, the coil spring 35 is held between the upper spring seat 32 and the lower spring seat 34, and the spring mechanism 3 is accommodated in the spring case 36. Therefore, it is possible to obtain the biasing force in both upper and lower directions by means of the integral coil spring 35, the number of parts can be reduced, and the structure of the spring mechanism 3 can be simplified.

The electric motor 40 is controlled such that the eccentric cam 42 is abutted and stopped at the reciprocating end and then, the electric motor 40 is stopped by the timer. Therefore, it is possible to prevent the motor driving system from being damaged while precisely stopping the electric motor 40 at the reciprocating end position of the eccentric cam 42.

Further, the coil spring 35 is restrained by the upper spring seat 32, the lower spring seat 34, the spring shaft 30 and the spring case 36, and the coil spring 35 is previously mounted in its compressed state. Therefore, the biasing force for holding the closed states of the valve openings 10a and 10b by the valve body 20 can be obtained if the coil spring 35 is compressed through additional short stroke from the compressed state. Thus, it is possible to make the vale compact by shortening the stroke, and to reduce the energy required for compressing the spring.

Figure 4:
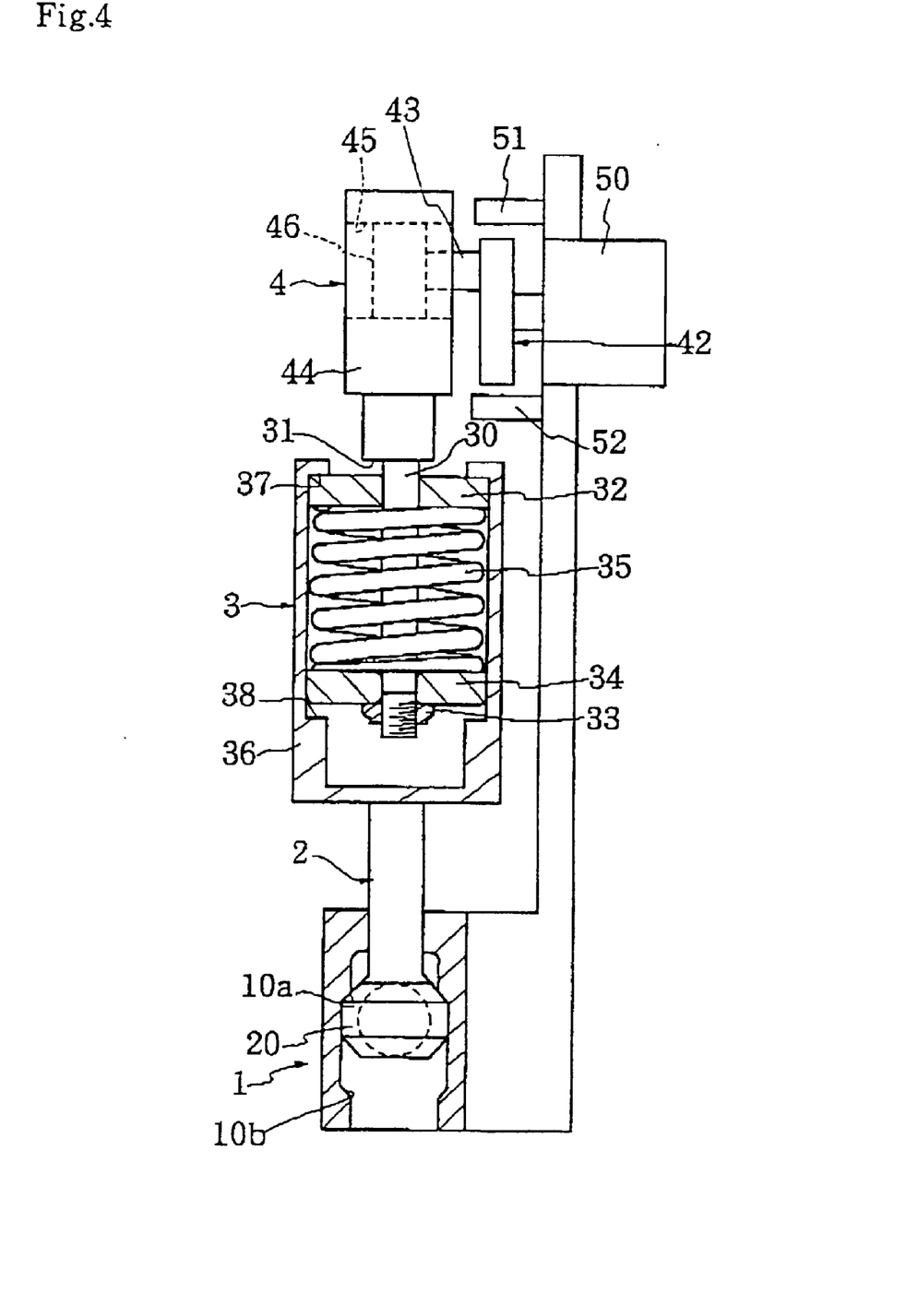
FIG. 4 is a side sectional view of a direct-acting electric operated valve according to a second embodiment of the invention.

Next, FIG. 4 is a side sectional view of a direct-acting electric operated valve according to a second embodiment of the invention.

This direct-acting electric operated valve has position sensor 51 and 52 for detecting the top dead center X1 and the bottom dead center Y1 of the eccentric cam (rotor) 42 which rotary reciprocates by an electric motor 50. The position sensor 51 and 52 detect the reciprocating end of the eccentric cam 42, and the electric motor 50 is stopped by signals from the position sensor 51 and 52.

Therefore, if the eccentric cam 42 reaches near the top dead center X1 and the bottom dead center Y1, the electric motor 50 is stopped by the signals from the position sensor 51 and 52 and thereafter, the eccentric cam 42 reaches the reciprocating end by the inertia force and the spring force. Thus, it is possible to prevent the motor driving system from being damaged while precisely stopping the electric motor 50 at the reciprocating end position of the eccentric cam 42.

Other structure and effect are the same as those of the first embodiment.

Figure 5:
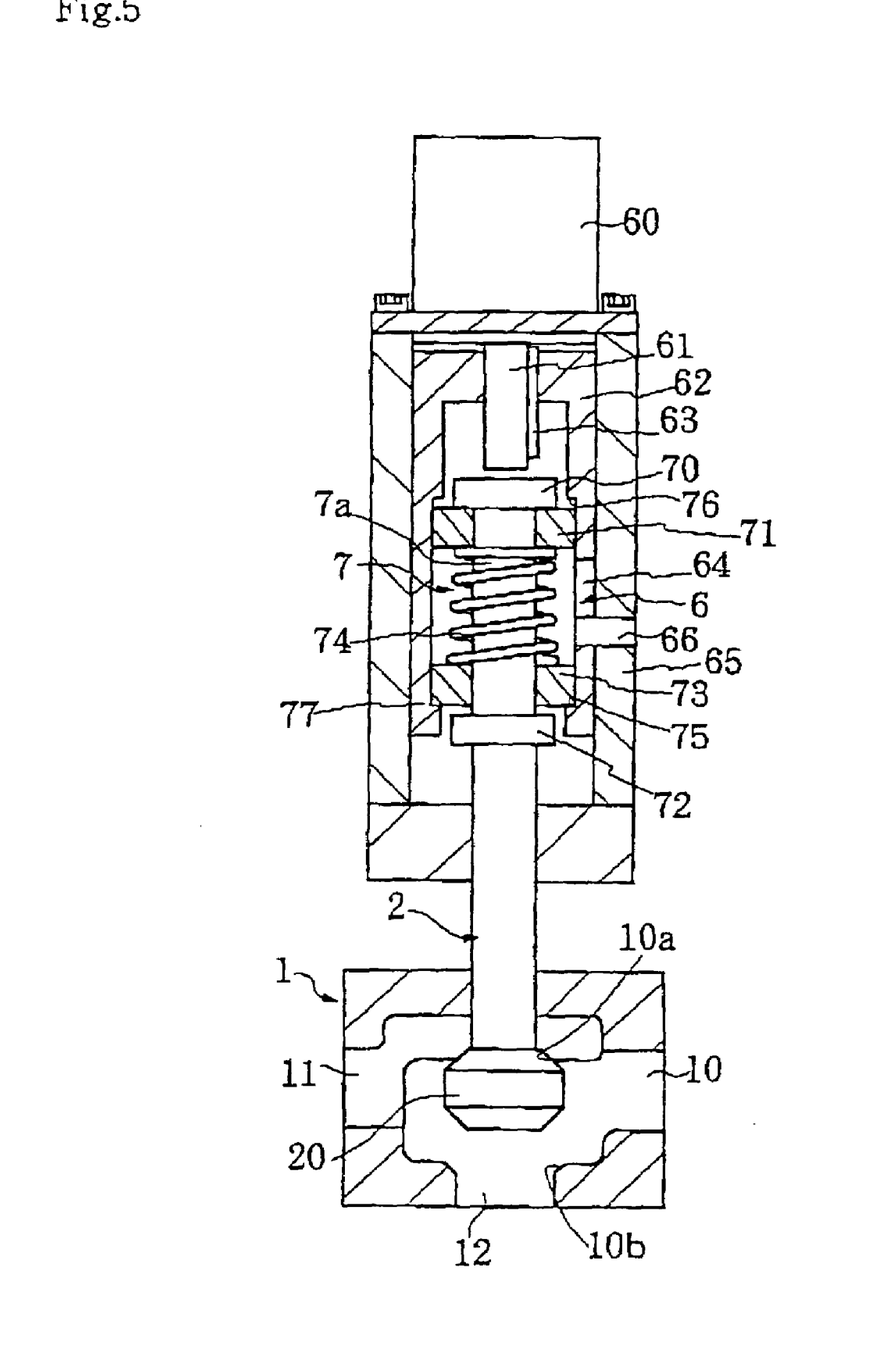
FIG. 5 is a front sectional view of a direct-acting electric operated valve according to a third embodiment of the invention.
Figure 6:
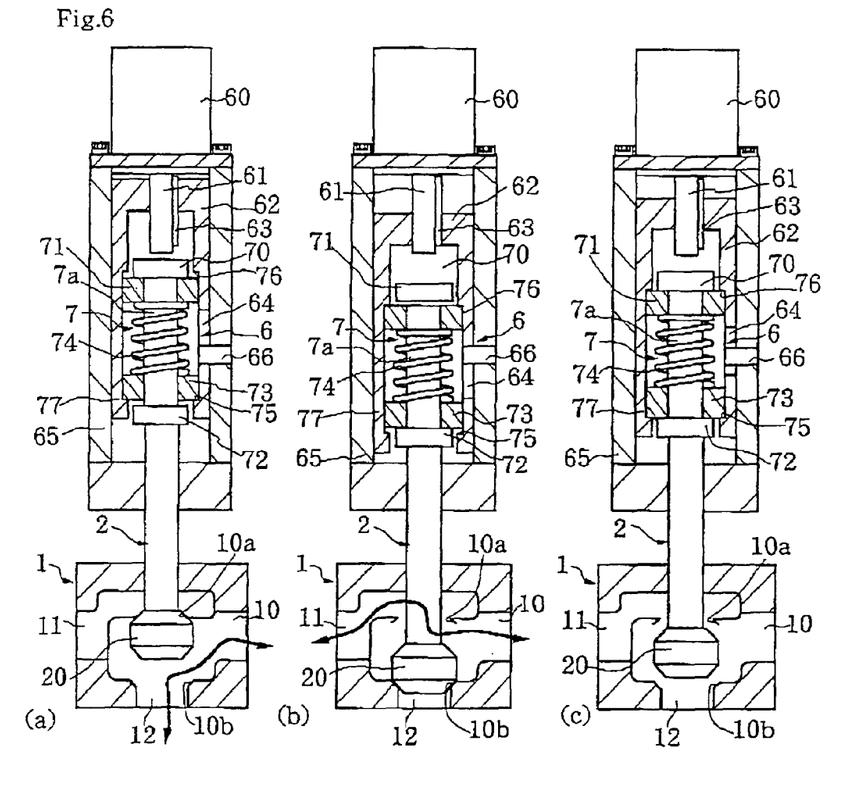
FIG. 6 are explanatory views of operation of the direct-acting electric operated valve.
Figure 7:
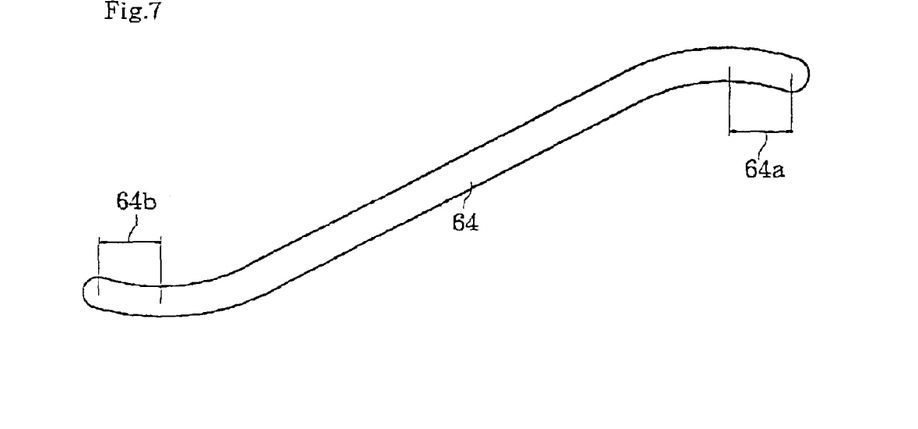
FIG. 7 is a development view showing a helical cam groove of a cam mechanism.

Next, FIG. 5 is a front sectional view of a direct-acting electric operated valve according to a third embodiment of the invention, FIG. 6 are explanatory views of operation of the direct-acting electric operated valve and FIG. 7 is a development view showing a helical cam groove of a cam mechanism. Since a structure of the valve body 1 is the same as that of the first embodiment, explanation thereof will be omitted.

In a cam mechanism 6 of this direct-acting electric operated valve, a cylinder body (rotor) 62 which laterally rotary reciprocates is vertically movably mounted to an electric motor shaft 61 of an electric motor 60 through a key 63 in a state in which the cylinder body 62 is fixed in the rotation direction. The cylinder body 62 is integrally formed with a spring case 77. A vertical helical cam groove 64 is formed in the spring case 77. A guide pin 66 projecting from a stationary cylinder 65 is slidably fitted into the helical cam groove 64, and rotary reciprocating motion of the cylinder body 62 by the electric motor 60 is converted into vertical reciprocating motion of the cylinder body 62 itself through the helical cam groove 64 and the guide pin 66.

As shown in FIG. 7, reversely inclined portions 64a and 64b are respectively formed at portions of the helical cam groove 64 slightly short of its upper end lower ends. The stationary cylinder 65 may be formed with the helical cam groove 64, and the guide pin 66 may project from the cylinder body 62.

The electric motor 60 is controlled such that the eccentric cam is abutted and stopped and the electric motor 60 is stopped by the timer as in the second embodiment. Alternatively, the position sensor may detect positions close to inflection points of the inclined portions 64a and 64b, and the electric motor 60 may be stopped by a signal from the position sensor.

The spring mechanism 7 has a spring shaft 7a extending from an upper end of the stem 2. Mounted to the spring shaft 7a are an upper spring seat 71 those upward movement is limited by an upper stopper 70, a lower spring seat 73 whose downward movement is limited by a lower stopper 72, and an integral coil spring 74 which is previously held between both the spring seats 71 and 73 in its compressed state. The upper spring seat 71, the lower spring seat 73 and the coil spring 74 are accommodated in a spring case 77 which is integrally formed with the cylinder body 62.

In this case, the spring shaft 7a may extend from the cylinder body 62, and the spring case 77 may be connected to the stem 2.

As shown in FIG. 6(a), in a state in which the cylinder body 62 moves upward and the stem 2 moves upward through the spring mechanism 7 and the valve body 20 closes the first valve opening 10a, the lower spring seat 73 is biased by the coil spring 74, the lower spring seat 73 is fixed to the lower retaining portion 75 of the spring case 77, the upper spring seat 71 is engaged with the upper stopper 70 of the stem 2, thereby biasing the stem 2 upward, and the closed state of the first valve opening 10a by the valve body 20 is maintained.

As shown in FIG. 6(b), in a state in which the cylinder body 62 moves downward and the stem 2 moves downward through the spring mechanism 7 and the valve body 20 closes the second valve opening 10b, the upper spring seat 71 is biased by the coil spring 74 and fixed to the upper retaining portion 76 of the spring case 77, the lower spring seat 73 is engaged with the lower stopper 72 of the stem 2, thereby biasing the stem 2 downward, and the closed state of the second valve opening 10b by the valve body 20 is maintained.

As shown in FIG. 6(c). In a state in which the stem 2 moves through the spring mechanism 7 by the cam mechanism 6 and the valve body 20 moves between the first valve opening 10a and the second valve opening 10b, the upper spring seat 71 is biased by the coil spring 74 and the upper spring seat 71 and the lower spring seat 73 are fixed to the upper retaining portion 76 and the lower retaining portion 75 of the spring case 77, the upper spring seat 71 and the lower stopper 72 are engaged with the upper spring seat 71 and the lower spring seat 73 are engaged with the upper stopper 70 and the lower stopper 72 of the stem 2, thereby integrally forming the spring mechanism 7.

As described above, according to the direct-acting electric operated valve of this embodiment, the rotary reciprocating motion of the cylinder body 62 which uses the electric motor as the driving means is converted into the vertical reciprocating motion by the cam mechanism 6, and the vertical reciprocating motion of the cam mechanism 6 is transmitted to the stem through the spring mechanism 7.

Further, the reversely inclined portions 64a and 64b are respectively formed at portions of the helical cam groove 64 slightly short of its upper end lower ends. Therefore, it is possible to keep biasing the stem 2 while restraining the cylinder body 62 from reversely rotating. With this arrangement, it is possible to hold the members at their own positions, and the closed states of the valve opening 10a and 10b by the valve body 20 can be maintained.

Other structures are the same as those of the first embodiment.

INDUSTRIAL APPLICABILITY

As explained above, according to the direct-acting electric operated valve of the present invention (claim 1), there is provided the cam mechanism and the spring mechanism as driving means for the electric motor. Therefore, unlike the conventional air driving type piston valve, the direct-acting electric operated valve of the present invention does not required the air pipe (usually copper pipe), construction and maintenance costs are not required for the copper pipe and the solenoid valve.

Further, the eccentric cam is retained at an upper retaining position which slightly exceeds a top dead center position and at a lower retaining position which slightly exceeds a bottom dead center position. Therefore, it is possible to keep biasing the stem while limiting the reverse rotation of the eccentric cam. The members can be held in their positions and the closed state of the valve opening by the valve body can be maintained.

Therefore, it is possible to eliminate the danger that when a power supply is stopped, air is vented and the piston is returned by a spring unlike the conventional air driving type piston valve.

Further, the spring mechanism is constructed such that the coil spring is held between the upper spring seat and the lower spring seat. Therefore, the biasing force both upward and downward can be obtained with the one integral coil spring, the number of parts can be reduced and the structure of the spring mechanism can be simplified.

A helical cam groove is formed at portions slightly short of its upper and lower ends with reversely inclined portions. Therefore, the reverse rotation of the cylinder body can be limited, the members can be held in their positions, and the closed state of the valve opening by the valve body can be maintained.

Further, the rotor is abutted and stopped at the reciprocating end and then, the electric motor is stopped by a timer. Therefore, it is possible to prevent an excessive load from continuously being applied to the electric motor, and to prevent the motor driving system from being damaged.

Further, there is provided a position sensor for detecting the reciprocating position of the rotor which is reciprocated by the electric motor. Therefore, it is possible to prevent the motor driving system from being damaged while precisely stopping the rotor at the reciprocating end using the electric motor.

Further, the coil spring is previously compressed and mounted. Therefore, the biasing force for maintaining the closed state of the valve opening by the valve body can be obtained by additionally compressing the spring with a shortened stroke from a compressed state. Thus, it is possible to make the valve compact by shortening the stroke, which reduces the energy required for compressing the spring.

What is claimed is:

1. A direct-acting electric operated valve in which a stem vertically reciprocates, a valve body reciprocates between a first valve opening and a second valve opening, a second passage is brought into communication with a main passage in a closed state of said first valve opening by said valve body, and a first passage is brought into communication with the main passage in a closed state of said second valve opening by said valve body, comprising:

a cam mechanism for converting rotary reciprocating motion of a rotor driven by an electric motor into vertical reciprocating motion, and a spring mechanism provided between said cam mechanism and said stem, wherein if said cam mechanism moves upward, said stem is moved upward by said spring mechanism, said first valve opening is closed by said valve body, said stem is held upward by said spring mechanism and the closed state of said first valve opening by said valve body is maintained, if said cam mechanism moves downward, said stem is moved downward by said spring mechanism, said valve body closes said second valve opening, said stem is held downward by said spring mechanism, and the closed state of said second valve opening by said valve body is maintained, said cam mechanism converts the rotary reciprocating motion of the rotor into vertical reciprocating motion of a cam-receiving plate, the cam mechanism includes an eccentric cam that is retained at an upper retaining position which slightly exceeds a top dead center position and at a lower retaining position which slightly exceeds a bottom dead center position.

2. A direct-acting electric operated valve according to claim 1, wherein said spring mechanism is accommodated in a spring case which is connected to said stem or cam mechanism in a state in which an integral coil spring held between an upper spring seat and a lower spring seat is mounted to a spring shaft extending from said cam mechanism or stem, in a state in which said cam mechanism moves upward and said stem is moved upward by said spring mechanism and said valve body closes said first valve opening, said lower spring seat is biased by said coil spring and fixed to said spring shaft, said upper spring seat is engaged with said spring case to bias said stem upward, and the closed state of said first valve opening by said valve body is maintained, in a state in which said cam mechanism moves downward and said stem is moved downward by said spring mechanism and said valve body closes said second valve opening, said upper spring seat is biased by said coil spring and fixed to said spring shaft, said lower spring seat is engaged with said spring case to bias said stem downward, and the closed state of said second valve opening by said valve body is maintained, in a state in which said stem is moved by said cam mechanism acting through said spring mechanism and said valve body moves between said first valve opening and said second valve opening, said upper spring seat and said lower spring seat are biased by said coil spring and fixed to said spring shaft, thereby integrally forming said spring mechanism.

3. A direct-acting electric operated valve according to claim 2, wherein said rotor is abutted and stopped at the reciprocating end and then, said electric motor is stopped by a timer.

4. A direct-acting electric operated valve according to claim 2, wherein a position sensor detects a rotary reciprocating position of said rotor, and said electric motor is stopped by a signal from said position sensor.

5. A direct-acting electric operated valve according to claim 2, wherein said coil spring is mounted in its compressed state.

6. A direct-acting electric operated valve according to claim 1, wherein said rotor is abutted and stopped at the reciprocating end and then, said electric motor is stopped by a timer.

7. A direct-acting electric operated valve according to claim 6, wherein said coil spring is mounted in its compressed state.

8. A direct-acting electric operated valve according to claim 1, wherein a position sensor detects a rotary reciprocating position of said rotor, and said electric motor is stopped by a signal from said position sensor.

9. A direct-acting electric operated valve according to claim 8, wherein said spring mechanism includes a coil spring mounted in its compressed state.

10. A direct-acting electric operated valve according to claim 1, wherein said spring mechanism includes a coil spring mounted in its compressed state.

11. A direct-acting electric operated valve in which as a stem vertically reciprocates, a valve body reciprocates between a first valve opening and a second valve opening, a second passage is brought into communication in a closed state of said first valve opening by said valve body, and a first passage is brought into communication with a main passage in a closed state of said second valve opening by said valve body, comprising:

a cam mechanism for converting rotary reciprocating motion of a rotor driven by an electric motor into vertical reciprocating motion, and a spring mechanism provided between said cam mechanism and said stem, wherein if said cam mechanism moves upwardly, said stem is moved upward by said spring mechanism, said first valve opening is closed by said valve body, said stem is held upward by said spring mechanism and the closed state of said first valve opening by said valve body is maintained, if said cam mechanism moves downwardly, said stem is moved downward by said spring mechanism, said valve body closes said second valve opening, said stem is held downward by said spring mechanism, and the closed state of said second valve opening by said valve body is formed as maintained, a cylinder body which laterally rotary reciprocates comprises said rotor, said cam mechanism converts the rotary reciprocating motion of said cylinder body into vertical reciprocating motion of said cylinder body itself through a vertical helical cam groove and a guide pin which is slidably fitted into said helical cam groove, said helical cam groove is formed at its portions slightly short of its upper and lower ends with reversely inclined portions.

12. A direct-acting electric operated valve according to claim 11, wherein said spring mechanism is accommodated in a spring case which is connected to said stem or cylinder body in a state in which an integral coil spring held between an upper spring seat and a lower spring seat is mounted to a spring shaft extending from said cylinder body or stem, in a state in which said cam mechanism moves upward and said stem is moved upward by said spring mechanism and said valve body closes said first valve opening, said lower spring seat is biased by said coil spring and fixed to said cylinder body, said upper spring seat is engaged with said stem to bias said stem upward, and the closed state of said first valve opening by said valve body is maintained, in a state in which said cam mechanism moves downward and said stem is moved downward by said spring mechanism and said valve body closes said second valve opening, said upper spring seat is biased by said coil spring and fixed to said cylinder body, said lower spring seat is engaged with said stem to bias said stem downward, and the closed state of said second valve opening by said valve body is maintained, in a state in which said stem is moved by said cam mechanism acting through said spring mechanism and said valve body moves between said first valve opening and said second valve opening, said upper spring seat and said lower spring seat are biased by said coil spring and fixed to said cylinder body, said upper spring seat and said lower spring seat are engaged with said stem, thereby integrally forming said spring mechanism.

13. A direct-acting electric operated valve according to claim 12, wherein said rotor is abutted and stopped at the reciprocating end and then, said electric motor is stopped by a timer.

14. A direct-acting electric operated valve according to claim 12, wherein a position sensor detects a rotary reciprocating position of said rotor, and said electric motor is stopped by a signal from said position sensor.

15. A direct-acting electric operated valve according to claim 12, wherein said coil spring is mounted in its compressed state.

16. A direct-acting electric operated valve according to claim 11, wherein said rotor is abutted and stopped at the reciprocating end and then, said electric motor is stopped by a timer.

17. A direct-acting electric operated valve according to claim 11, wherein a position sensor detects a rotary reciprocating position of said rotor, and said electric motor is stopped by a signal from said position sensor.

18. A direct-acting electric operated valve according to claim 11, wherein said spring mechanism includes a coil spring mounted in its compressed state.

* * * * *